(12) United States Patent
Kraft et al.

(10) Patent No.: US 10,840,516 B2
(45) Date of Patent: Nov. 17, 2020

(54) FLOW ELEMENT, BIPOLAR PLATE AND METHOD FOR PRODUCING A FLOW ELEMENT

(71) Applicant: ElringKlinger AG, Dettingen (DE)

(72) Inventors: Juergen Kraft, Metzingen (DE); Manuel Morcos, Tuebingen (DE); Michael Goetz, Dettingen/Erms (DE)

(73) Assignee: ElringKlinger AG, Dettingen (DE)

( * ) Notice: Subject to any disclaimer, the term of this patent is extended or adjusted under 35 U.S.C. 154(b) by 439 days.

(21) Appl. No.: 15/442,692

(22) Filed: Feb. 26, 2017

(65) Prior Publication Data

US 2017/0170489 A1 Jun. 15, 2017

Related U.S. Application Data

(63) Continuation of application No. PCT/EP2015/069214, filed on Aug. 21, 2015.

(30) Foreign Application Priority Data

Sep. 2, 2014 (DE) .......................... 10 2014 112 607

(51) Int. Cl.
*H01M 8/026* (2016.01)
*H01M 8/0206* (2016.01)
*H01M 8/0263* (2016.01)

(52) U.S. Cl.
CPC ......... *H01M 8/026* (2013.01); *H01M 8/0206* (2013.01); *H01M 8/0263* (2013.01)

(58) Field of Classification Search
CPC ... H01M 8/0206; H01M 8/206; H01M 8/0263
See application file for complete search history.

(56) References Cited

U.S. PATENT DOCUMENTS

| | | | |
|---|---|---|---|
| 7,781,087 | B2 | 8/2010 | Rock et al. |
| 2009/0169964 | A1 | 7/2009 | Ikeda |

FOREIGN PATENT DOCUMENTS

| | | |
|---|---|---|
| DE | 10 2006 044 763 A1 | 4/2008 |
| DE | 10 2006 059 857 A1 | 6/2008 |

(Continued)

OTHER PUBLICATIONS

Thesis of Ruge, "Development of a Liquid-Cooled Polymer-Electrolyte-Membrane-Fuel cell stack with a capacity of 6.5 kW" Eidgenous Tech. Institute, Germany, 2003, 148 pages.

(Continued)

*Primary Examiner* — Ula C Ruddock
*Assistant Examiner* — Frank A Chernow
(74) *Attorney, Agent, or Firm* — Aslan Law, P.C.

(57) ABSTRACT

To provide a flow element which in particular is used as a component of a bipolar plate in electrochemical devices, which is stable and permits efficient flow guiding, it is proposed that the flow element comprises a plate-like main body that is formed as a shaped sheet metal product and has a channel structure, wherein the channel structure comprises a plurality of channels which are formed by recesses in the main body and are separated from one another by raised portions of the main body, wherein there is provided at least one region with normal level difference that defines, with respect to a height direction running perpendicular to two main directions of extent of the main body, a height difference between a recess and an adjoining raised portion, wherein there is provided at least one region with reduced level difference, in which a height difference between a recess and an adjoining raised portion is less than the normal level difference, wherein the at least one region with reduced level difference comprises a parallel expansion region of the main body that, in the event of an expansion of the main (Continued)

body resulting from the deformation of the shaped sheet metal product, is expanded along expansion vectors which lie in mutually parallel planes, wherein the at least one region with reduced level difference, that comprises the parallel expansion region of the main body, adjoins a curvature expansion region of the main body which, in the event of an expansion of the main body resulting from the deformation of the shaped sheet metal product, is expanded along expansion vectors which lie in intersecting planes.

18 Claims, 9 Drawing Sheets

(56) References Cited

FOREIGN PATENT DOCUMENTS

| | | |
|---|---|---|
| DE | 10 2007 036 477 A1 | 2/2009 |
| EP | 3 054 513 B1 | 7/2018 |
| JP | 2007-165257 A | 6/2007 |

OTHER PUBLICATIONS

Kleemann et al "Requirements for advanced Gas Diffusion Layer Materials in automotive Applications" Burnaby, Canada; f-cell Conference; Oct. 9, 2012; 2 pages.

FLOW ELEMENT, BIPOLAR PLATE AND METHOD FOR PRODUCING A FLOW ELEMENT

RELATED APPLICATION

This application is a continuation of international application No. PCT/EP2015/069214 filed on Aug. 21, 2015, and claims the benefit of German application No. 10 2014 112 607.6 filed on Sep. 2, 2014, which are incorporated herein by reference in their entirety and for all purposes.

FIELD OF DISCLOSURE

The present invention relates to a flow element which in particular is used as a component of a bipolar plate in electrochemical devices.

SUMMARY OF THE INVENTION

The object of the present invention is to provide a flow element which is stable and permits efficient flow guiding.

This object is achieved in accordance with the invention by a flow element which comprises a plate-like main body that is formed as a shaped sheet metal product and has a channel structure, wherein the channel structure comprises a plurality of channels which are formed by recesses in the main body and are separated from one another by raised portions of the main body, wherein there is provided at least one region with normal level difference that denotes, with respect to a height direction running perpendicular to two main directions of extent of the main body, a height difference between a recess and an adjoining raised portion, wherein there is provided at least one region with reduced level difference, in which a height difference between a recess and an adjoining raised portion is less than the normal level difference, wherein the at least one region with reduced level difference comprises a parallel expansion region of the main body that, in the event of an expansion of the main body resulting from the deformation of the shaped sheet metal product, is expanded along expansion vectors which lie in mutually parallel planes, wherein the at least one region with reduced level difference, that comprises the parallel expansion region of the main body, adjoins a curvature expansion region of the main body which, in the event of an expansion of the main body resulting from the deformation of the shaped sheet metal product, is expanded along expansion vectors which lie in intersecting planes.

Due to the features of the flow element according to the invention, said flow element can be formed preferably so as to be stable. In particular, a material expansion to an undesirable extent during the production of the shaped sheet metal product can preferably be avoided. At the same time, efficient flow guiding by means of the flow element can preferably be provided.

A region with normal level difference, a region with reduced level difference, a parallel expansion region and/or a curvature expansion region preferably each denote a region of the main body comprising a channel segment of a channel.

A region of the main body comprising a channel segment of a channel preferably extends in a transverse direction, which is oriented substantially perpendicular to a direction of flow of a fluid guided in the channel, from one raised portion delimiting the channel to a further raised portion delimiting the channel.

A normal level difference is in particular a maximum level difference which is not exceeded over the entire main body.

The main body preferably can be placed against a flat surface on both sides, in particular at an underside and at an upper side of the main body with respect to a height direction. The surface regions of the upper side and underside by means of which the main body can be placed against the flat surfaces and comes directly into contact therewith preferably lie in a contact plane of the upper side and a contact plane of the underside, respectively.

In a region with normal level difference, at least one raised portion of the main body preferably extends as far as a contact plane of the upper side, and at least one recess of the main body extends as far as a contact plane of the underside of the main body.

In a region with normal level difference, a height difference running along the height direction is thus maximal between a lowest point of a recess (channel base) and a highest point of an adjoining raised portion (rib).

In a region with reduced level difference, at least one recess preferably does not extend as far as the contact plane of the underside of the main body.

Alternatively or additionally, it can be provided that at least one raised portion of the main body, in a region with reduced level difference, does not extend as far as a contact plane of the upper side of the main body.

A parallel expansion region of the main body is preferably a region of the main body in which an expansion of the main body resulting from the deformation of the shaped sheet metal product is provided in such a way that the expansion vectors lie in cross-sectional planes taken perpendicular to the direction of flow of a fluid, wherein cross-sectional planes arranged in succession along the direction of flow are aligned parallel to one another.

In one embodiment of the invention, it can be provided that at least one region with reduced level difference comprises exclusively a parallel expansion region of the main body.

Alternatively, provision can be made that at least one region with reduced level difference extends into a curvature expansion region of the main body.

The region with reduced level difference then preferably comprises a parallel expansion region of the main body and a curvature expansion region of the main body.

It can be favourable if at least one parallel expansion region is a region of the main body which comprises a substantially linear channel segment of a channel or is formed by a substantially linear channel segment of a channel.

A linear channel segment is preferably a channel segment in which a fluid is guided or can be guided along a linear flow path.

It can also be advantageous if at least one region with reduced level difference is a region of the main body which comprises a substantially linear channel segment of a channel or is formed by a substantially linear channel segment of a channel.

At least one curvature expansion region is preferably a region of the main body which comprises a curved or bent channel segment of a channel or is formed by a curved or bent channel segment of a channel.

A curved or bent channel segment is preferably a channel segment in which a fluid is guided or can be guided along a curved or bent flow path.

A curved or bent channel segment by way of example can be a flow deflection segment, in which a single or multiple flow deflection of a fluid guided in the channel is provided, for example a single or multiple flow deflection by at least approximately 60°, for example at least approximately 80°, in particular approximately 90°, or approximately 180°.

It can also be provided that at least one curvature expansion region is a region of the main body which comprises a channel end and/or a rib end of a channel or is formed by a channel end and/or a rib end of a channel.

A channel end is in particular a segment of a channel in which a recess forming the channel and/or two raised portions delimiting the channel end or terminate.

It can be provided that at least one region with normal level difference comprises a curved or bent channel segment of a channel or is formed by a curved or bent channel segment of a channel.

It can be provided in particular that at least one region with reduced level difference is formed in part by a substantially linear channel segment of a channel and in part by a curved or bent channel segment of the same channel following on from the substantially linear channel segment. This region with reduced level difference, preferably along the direction of flow of the fluid, adjoins a region with normal level difference, which in particular comprises a curved or bent channel segment of a channel and/or a substantially linear channel segment of a channel or is formed by a curved or bent channel segment of a channel and/or a substantially linear channel segment of a channel.

It can be advantageous if, in at least one region with normal level difference, on the one hand a channel base formed by the recess and on the other hand a rib formed by the adjoining raised portion run substantially parallel to one another.

It can also be provided that, in at least one region with normal level difference, on the one hand a channel base formed by the recess and on the other hand a rib formed by the adjoining raised portion run skewed relative to one another.

In at least one region with reduced level difference, on the one hand a channel base formed by the recess and on the other hand a rib formed by the adjoining raised portion preferably run substantially parallel to one another.

The flow element according to the invention is suitable in particular for use as a bipolar plate or for use in a bipolar plate.

The present invention therefore also relates to a bipolar plate, in particular for an electrochemical device, which comprises one or more flow elements according to the invention.

The bipolar plate according to the invention preferably has single or several of the features and/or advantages described in conjunction with the flow element according to the invention.

It can be advantageous if the bipolar plate comprises a first flow element and at least one further flow element, wherein the first flow element and/or the at least one further flow element are flow elements according to the invention.

The first flow element is preferably arranged on the further flow element in such a way that the recesses in the main body extend in the direction of the further flow element.

Alternatively, it can be provided that the first flow element is arranged on the further flow element in such a way that the recesses in the main body extend away from the further flow element.

The recesses in the main body preferably lie against the further flow element at least in segments in the region of a channel base of the recesses.

At least one region with reduced level difference of the main body of the first flow element is preferably arranged at a spacing from the further flow element.

In particular, it can be provided that a gap is formed between the first flow element and the at least one further flow element in a region with reduced level difference of the main body of the first flow element.

The gap in particular forms a flow transfer region or a flow gate, which permits a fluid flow in this region between the first flow element and the at least one further flow element.

It can be favourable if at least one segment of a parallel expansion region of the main body of the first flow element is arranged at a spacing from the further flow element.

Alternatively or additionally, it can be provided that at least one segment of a curvature expansion region of the main body of the first flow element is arranged at a spacing from the further flow element.

It can be provided that the first flow element abuts against the further flow element in a contact plane of an underside of the first flow element.

The first flow element and the further flow element can be formed for example mirror-symmetrically with respect to the contact plane of the underside of the first flow element.

However, a non-mirror-symmetrical embodiment of the first flow element and the further flow element can also be provided.

The present invention also relates to a method for producing a flow element, in particular a flow element for a bipolar plate of an electrochemical device.

The object of the present invention in this respect is to provide a method by means of which a flow element can be produced which is stable and permits efficient flow guiding.

This object is achieved in accordance with the invention by a method for producing a flow element, in particular a flow element according to the invention, wherein the method comprises the following steps: providing a main body;

deforming the main body so as to form a channel structure, wherein the channel structure comprises a plurality of channels which are formed by recesses in the main body and are separated from one another by raised portions of the main body, wherein at least one region with normal level difference is formed that denotes, with respect to a height direction running perpendicular to two main directions of extent of the main body, a height difference between a recess and an adjoining raised portion, wherein at least one region with reduced level difference is formed, in which a height difference between a recess and an adjoining raised portion is less than the normal level difference, wherein the at least one region with reduced level difference comprises a parallel expansion region of the main body that, in the event of the deformation of the main body, is expanded along expansion vectors which lie in mutually parallel planes, wherein the at least one region with reduced level difference, that comprises the parallel expansion region of the main body, adjoins a curvature expansion region of the main body which, in the event of the deformation of the main body, is expanded along expansion vectors which lie in intersecting planes.

The method according to the invention preferably has single or several of the features and/or advantages described in conjunction with the flow element according to the invention and/or the bipolar plate according to the invention.

The main body preferably has a channel structure comprising two or more channel paths each connecting an inlet side of the channel structure to an outlet side of the channel structure.

A channel path preferably comprises one or more meandering segments, in which a fluid is guided or can be guided in a meandering manner.

The main body of the flow element preferably at least approximately has a substantially constant material thickness, in particular before and/or after the production of the flow element.

In particular it can be provided that the material thickness of the main body varies over its entire extent substantially exclusively on account of an expansion of the main body resulting from the production of the recesses and raised portions.

A starting material for producing the flow element and thus a starting material of the main body is preferably a plate-like sheet metal.

Furthermore, the flow element according to the invention, the bipolar plate according to the invention and/or the method according to the invention preferably have/has single or several of the features and/or advantages described hereinafter:

Due to the configuration of the flow element according to the invention, an undesirable tearing of the main body during the production of the channel structure can preferably be avoided.

In particular due to one or more regions with reduced level difference, a lower degree of deformation of the main body during the production of the channel structure can be made possible preferably locally.

In order to compensate for a channel base that for example is raised, a widening and/or flattening of one or both flanks of a channel (region between the channel base and the adjoining raised portions) can be provided for example, in particular in order to keep a flow cross-section as constant as possible along the direction of flow.

The channel structure of the flow element in particular thus forms what is known as a flow field.

A multiplicity of support points or support regions between the upper side of the main body and the underside of the main body are preferably formed by the raised portions and recesses of the main body.

It can be provided that the bipolar plate comprises a total of three flow guides for three different fluids.

The bipolar plate can comprise for example two flow elements, wherein a first fluid can be guided or is guided between the two flow elements and a further fluid is guidable or is guided at mutually opposed outer sides of the flow elements.

A channel width of a channel of the channel structure of the main body is preferably at most approximately 3 mm, for example at most approximately 1.5 mm, in particular approximately 1 mm. A channel width is to be understood here in particular to mean a spacing between two ribs of the channel.

A channel depth of a channel is preferably at least approximately 0.3 mm, in particular at least approximately 0.4 mm, for example approximately 0.5 mm. In particular, such a channel depth is preferably provided in a region with normal level difference.

In a region with reduced level difference, the channel depth is preferably at most approximately 90%, for example at most approximately 80%, of the channel depth in a region with normal level difference.

The main body is preferably formed in a stamping process by deforming a thin sheet, in particular a metal sheet.

A material thickness of the main body is preferably less than 0.3 mm, in particular less than 0.15 mm, for example at most approximately 0.1 mm.

It can also be provided that a material thickness of the main body is approximately 0.05 mm.

By way of example, the main body can be formed from a metal material, in particular from a stainless steel with the designation 1.4404 or 1.4306.

It can be provided that a region with normal level difference is provided between two regions with reduced level difference. The region with normal level difference can then serve in particular for the stable support of the flow element at the upper side thereof and at the underside thereof.

Further preferred features and/or advantages of the invention are the subject of the following description and the illustration in the drawings of an exemplary embodiment.

Figure 1:
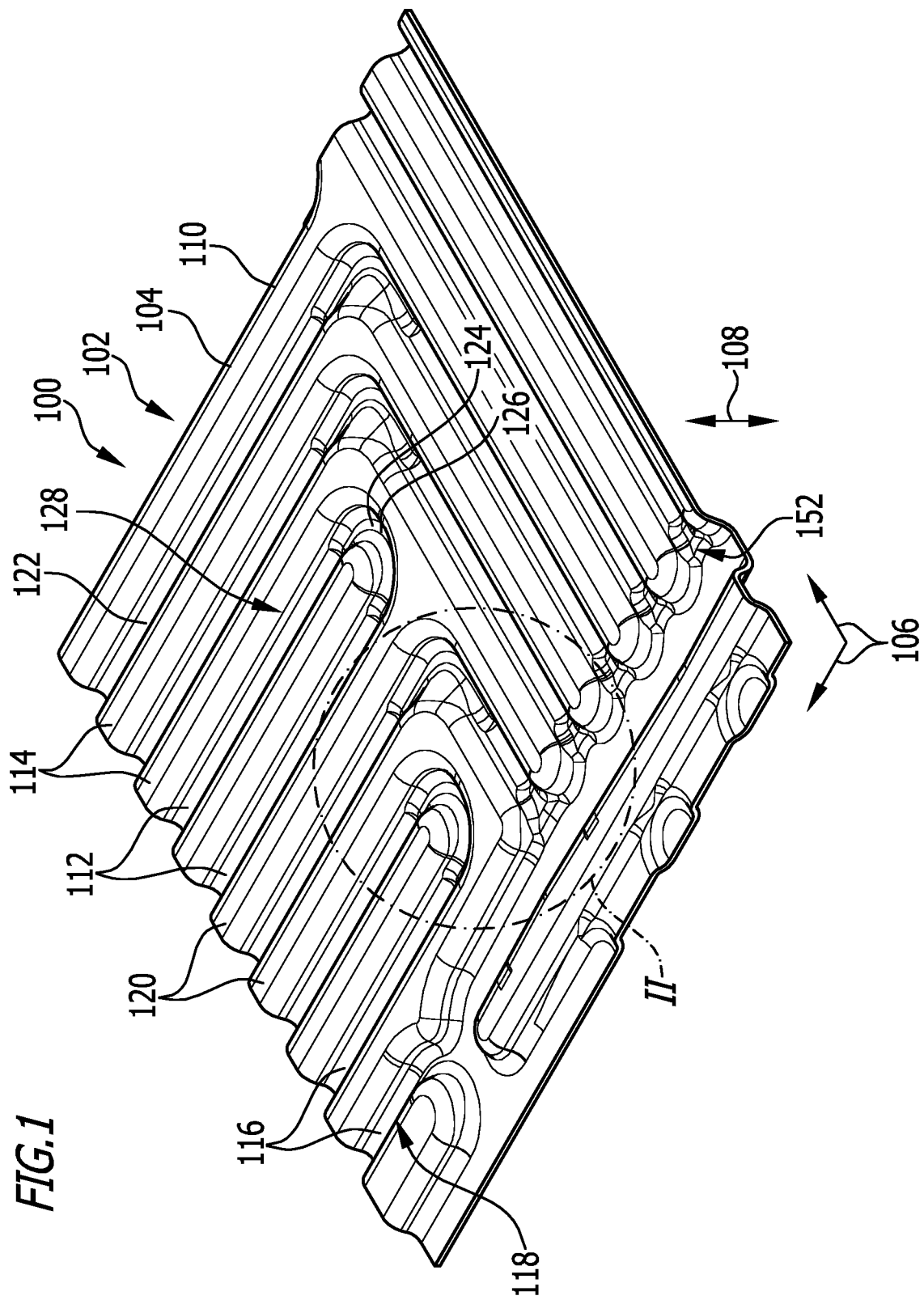
FIG. 1 shows a schematic perspective illustration of a flow element of a bipolar plate.

Like or functionally equivalent elements are provided in all drawings with the same reference signs.

DETAILED DESCRIPTION OF THE DRAWINGS

An embodiment, illustrated in FIGS. 1 to 11, of a bipolar plate denoted as a whole by 100 is used in particular in electrochemical devices, for example fuel cell devices. The bipolar plate 100 is used in particular for the electrical contacting of adjacent electrochemical units (cells) and also for supplying fluid, removing fluid, and for cooling The bipolar plate 100 comprises one or more flow elements 102.

In the embodiment of a bipolar plate 100 illustrated in FIGS. 1 to 11, two flow elements 102 are provided.

One of these flow elements 102 is illustrated separately in FIGS. 1 to 9 and will be described in greater detail hereinafter.

The flow element 102 comprises a main body 104, which is substantially plate-like and extends in two main directions of extent 106.

The main directions of extent 106 are in particular oriented perpendicular to one another and perpendicular to a height direction 108 of the main body 104.

The main body 104 is in particular a shaped sheet metal product 110, and as such is produced for example from a metal sheet by stamping.

The main body 104 in particular comprises a plurality of recesses 112 and a plurality of raised portions 114.

The recesses 112 in the main body 104 form channels 116 of a channel structure 118 of the flow element 102.

The raised portions 114 of the main body 104 form ribs 120 of the main body 104, between which the channels 116 run.

The channels 116 are linear in part.

In particular, the channels 116 each comprise one or more linear channel segments 122.

The channels 116 also comprise curved or bent channel segments 124, by means of which flow deflection segments 126 of the channels 116 are formed in particular.

The channels 116 of the flow element 102 serve in particular to guide a fluid, for example a gas or a liquid, from an inlet side of the flow element 102 to an outlet side of the flow element 102.

The channels 116 for example comprise one or more meandering segments 128, by means of which a uniform distribution of the guided fluid and/or a lengthening of a flow path can be provided.

In an assembled state of the flow element 102, the flow element 102 preferably abuts flatly on both sides against a further element.

The flow element 102 here in particular adjoins a first adjacent element by means of an upper side 130 and adjoins a second adjacent element by means of an underside 132.

The raised portions 114 and therefore the ribs 120 of the main body 104 extend into a common contact plane 134 of the upper side 130, in which preferably all regions of the flow element 102 which come into contact with the further element abutting against the upper side 130 are arranged.

The recesses 112 of the main body 104 extend preferably at least in segments into a contact plane 136 of the underside 132 of the main body 104.

Those regions of the main body 104 which come into contact with the further element in the assembled state of the flow element 102 preferably lie in the contact plane 136 of the underside 132 of the main body 104.

A spacing between the contact plane 134 and the contact plane 136 running parallel hereto gives a height H of the flow element 102.

Figure 2:
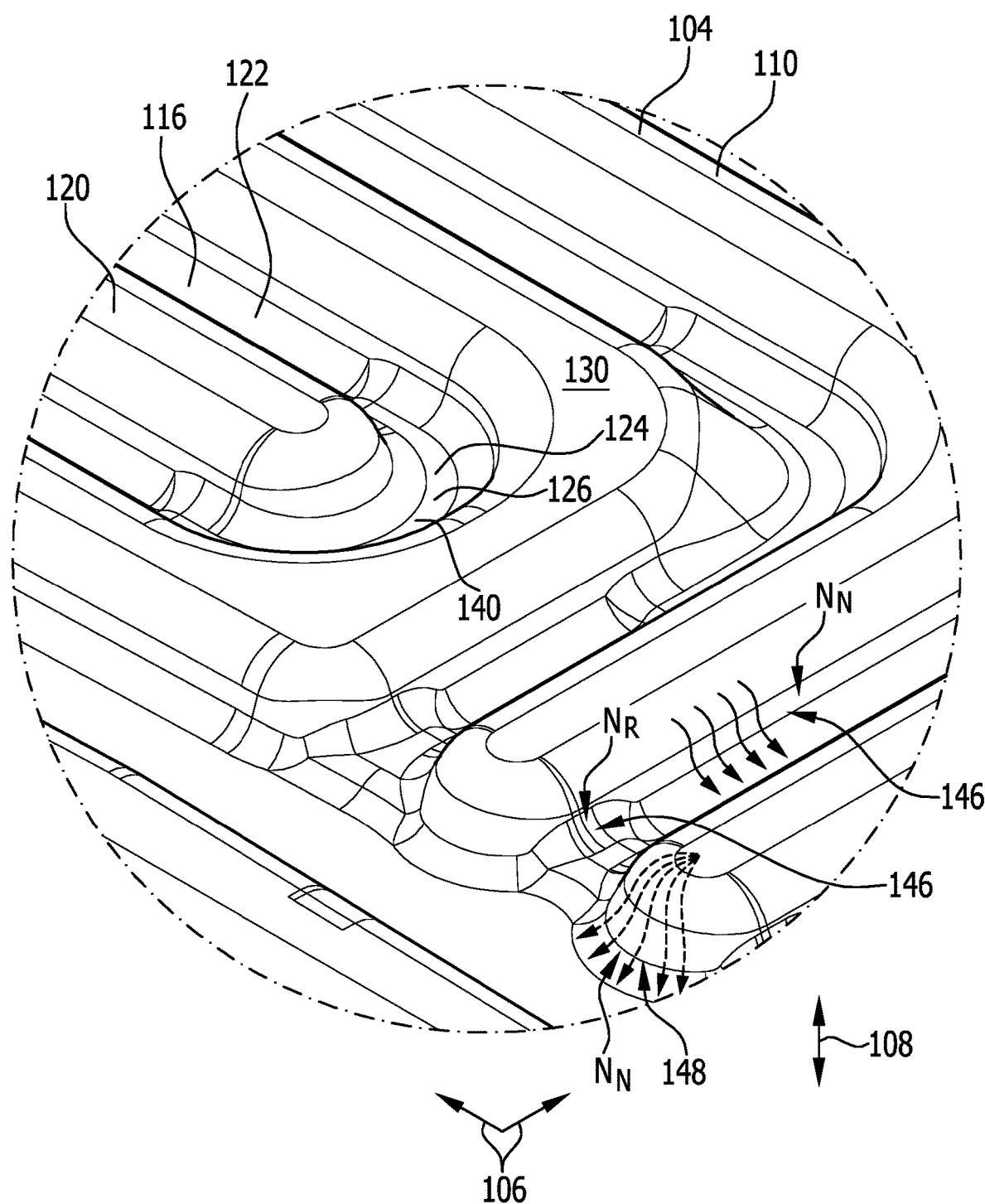
FIG. 2 shows an enlarged illustration of the region II in FIG. 1.
Figure 3:
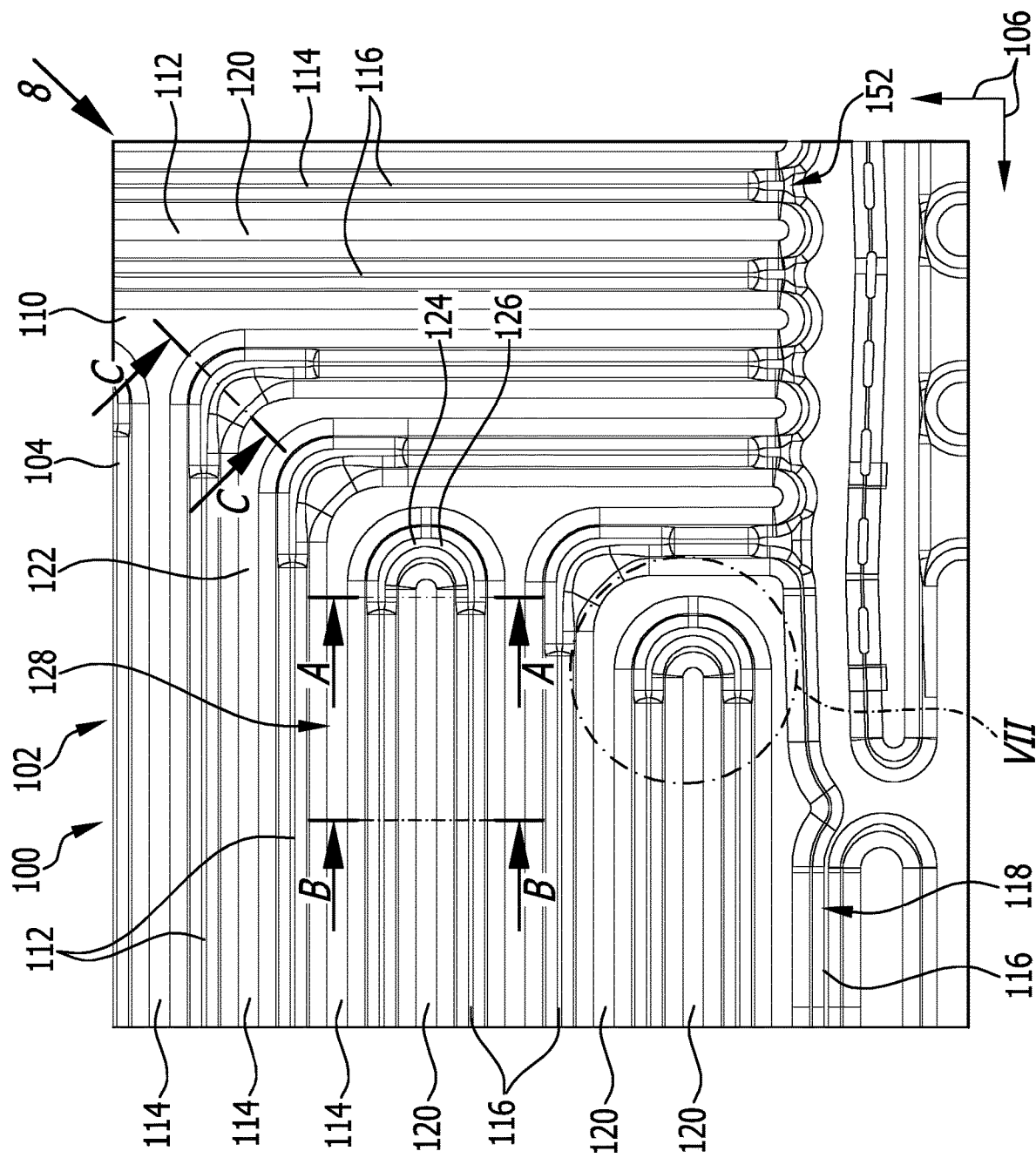
FIG. 3 shows a schematic plan view of an upper side of the flow element from FIG. 1.
Figure 8:
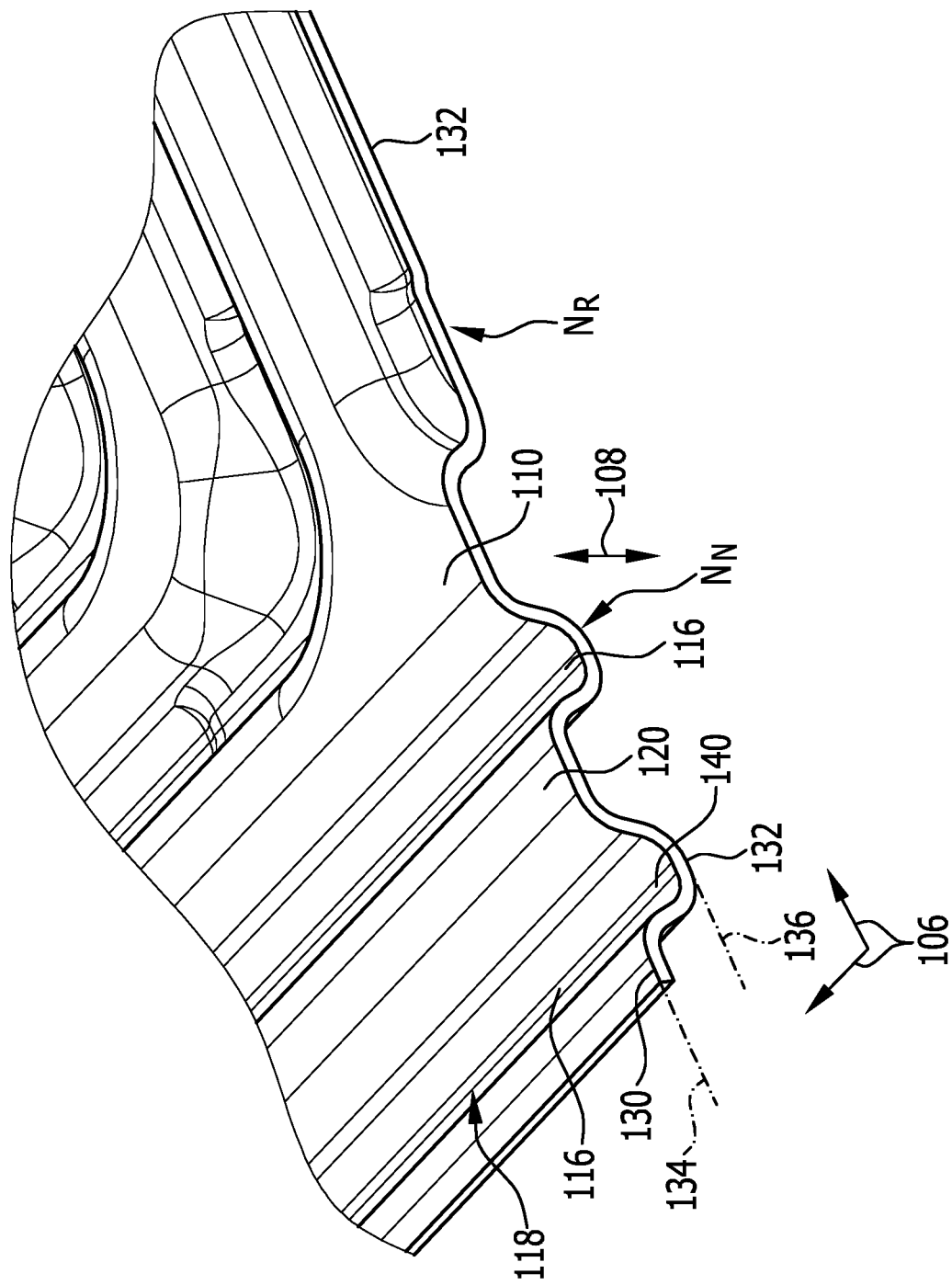
FIG. 8 shows an enlarged perspective illustration of the flow element, viewed in the direction of the arrow 8 in FIG. 3.
Figure 9:
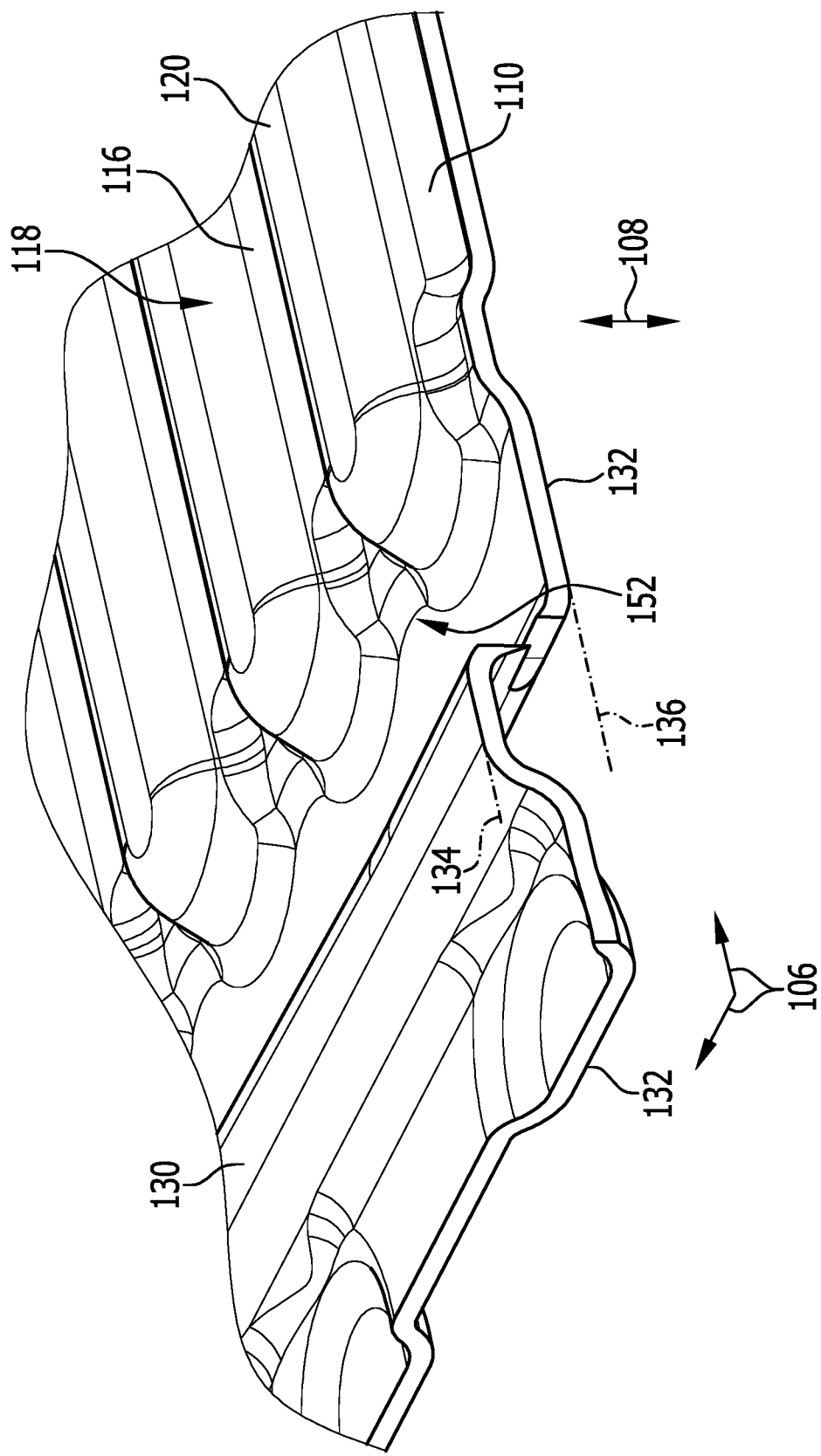
FIG. 9 shows an enlarged perspective sectional illustration of the flow element from FIG. 1.

Under consideration of the fact that the main body 104 is formed as a shaped sheet metal product 110, it is clear in particular from FIGS. 2, 8 and 9 that, for production of the channel structure 118, the main body 104 has to be deformed to varying degrees at different points in order to obtain the desired channel structure 118.

In particular, a region of flanks 138, which form a transition region between the recesses 112 and the raised portions 114, is greatly expanded here.

In order to avoid an excessive expansion, which can lead to a tearing of the main body 104, the main body 104 comprises regions with different level differences.

A level difference is to be understood here to mean a height difference between a recess 112 and an adjoining raised portion 114.

Figure 4:
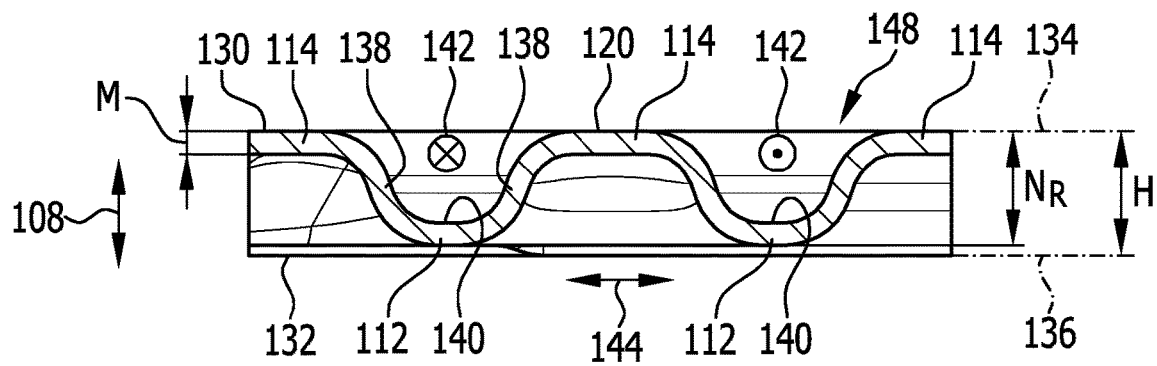
FIG. 4 shows a schematic sectional illustration through the flow element from FIG. 1 along the line A-A in FIG. 3.
Figure 5:
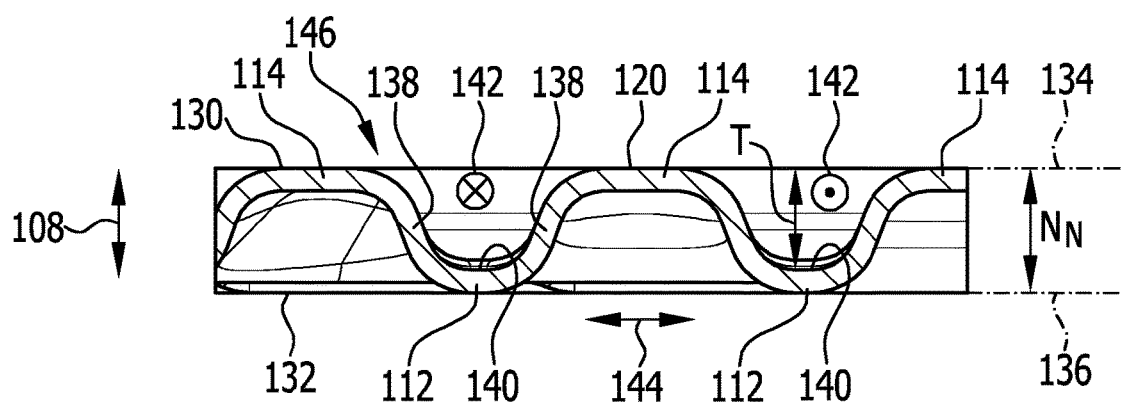
FIG. 5 shows a schematic sectional illustration of the flow element from FIG. 1 along the line B-B in FIG. 3.

In the case of the flow element 102 illustrated in FIGS. 1 to 11, a normal level difference $N_N$ is provided (see FIG. 5).

In a region with normal level difference $N_N$, a recess 112 extends as far as the contact plane 136 of the underside 132. Both adjoining raised portions 114 extend as far as the contact plane 134 of the upper side 130.

In a region with normal level difference $N_N$, a maximum channel depth T is thus provided. A deepest point of the channel 116, referred to hereinafter as the channel base 140, is thus spaced as far as possible from the contact plane 134 of the upper side 130 in the region with normal level difference $N_N$. A height difference between the channel base 140 and the rib 120, which ultimately lies in the contact plane 134 of the upper side 130, is thus also maximal.

A spacing between the channel base 140 and the bearing plane 136 of the underside 132 is given in the region of the normal level difference $N_N$ by a material thickness M of the main body 104 in the region of this channel base 140.

Figure 6:
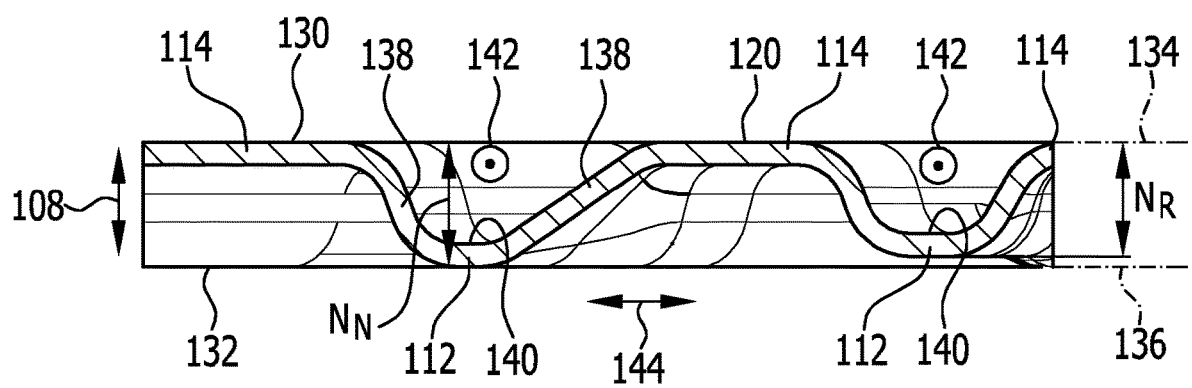
FIG. 6 shows a schematic sectional illustration of the flow element from FIG. 1 along the line C-C in FIG. 3.
Figure 7:
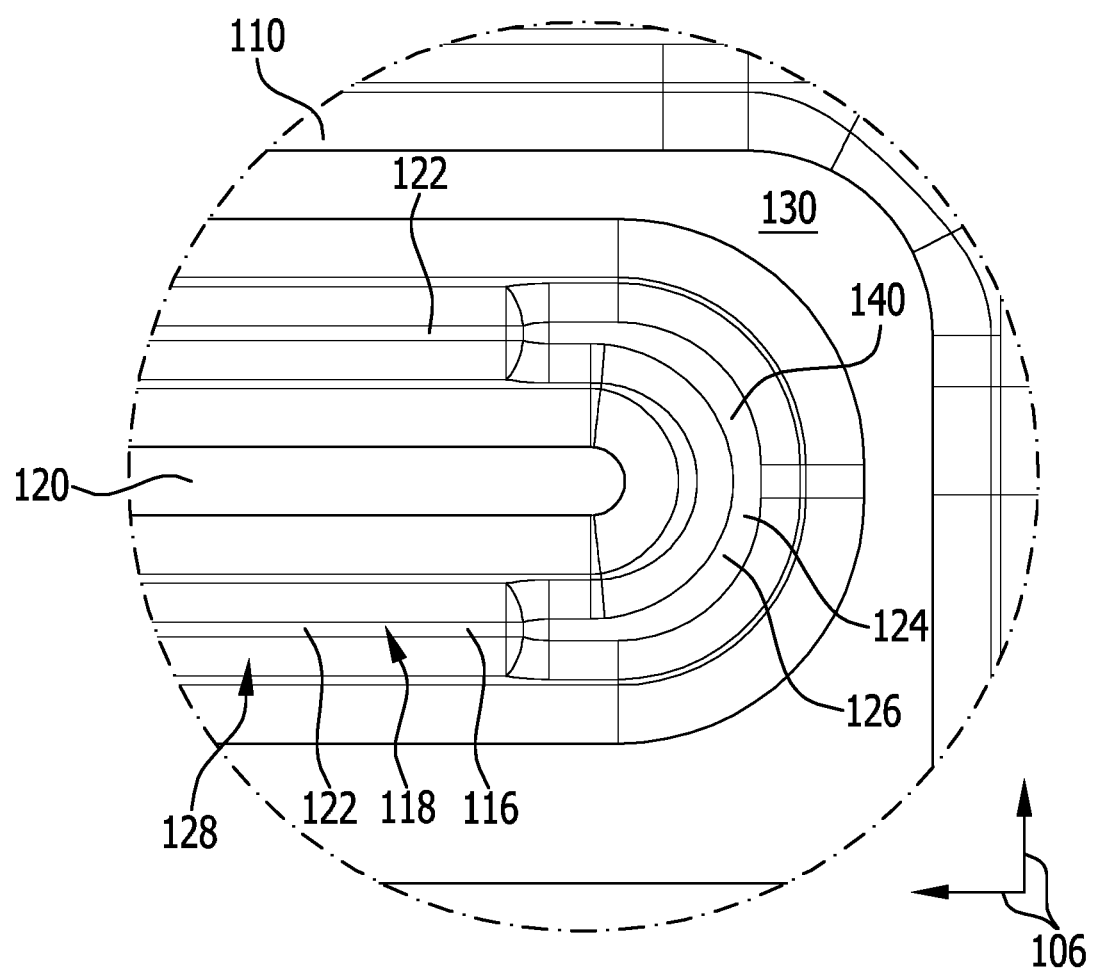
FIG. 7 shows an enlarged illustration of the region VII in FIG. 3.

Sectional illustrations through channels 116 of the main body 104 are illustrated in FIGS. 4 to 6.

The sectional illustrations are in particular cross-sections taken substantially perpendicular to a direction of flow 142.

The direction of flow 142 is the direction in which a fluid can be passed through the channels 116.

A transverse direction 144 is oriented perpendicular to the direction of flow 142 and runs in a plane spanned by the main directions of extent 106.

The transverse direction 144 is thus in particular perpendicular to the height direction 108.

With a deformation of the main body 104 in the region of a linear channel segment 122, a parallel expansion region 146 of the main body 104 is formed in particular.

In such a parallel expansion region 146, the material of the main body 104, in order to form the channels 116, is expanded in such a way that expansion vectors (indicated by arrows in FIG. 2) lie in mutually parallel planes.

The expansion vectors in particular lie in planes which are oriented perpendicular to the direction of flow 142 and parallel to one another.

A parallel expansion region 146 of this type is distinguishable in particular from a region of the main body 104 referred to hereinafter as a curvature expansion region 148.

A curvature expansion region 148 of the main body 104 is a region which, as the main body 104 is deformed in order to produce the channel structure 118, is expanded in such a way that the expansion vectors lie in intersecting planes (see FIG. 2).

In a parallel expansion region 146, the material of the main body 104 is expanded substantially uniformly in one direction.

By contrast, in a curvature expansion region 148, an expansion of the material of the main body 104 in a plurality of directions is provided in particular.

In a curvature expansion region 148, there is thus the risk of an undesirable material thickness reduction, which can result in a tearing of the main body 104.

This risk can be counteracted by raising the channel base 140 in specific regions of the main body 104.

A raising of the channel base of this type is implemented here in particular in that the recesses 112 are shallower in segments and therefore do not extend over the entire flow path within a channel 116 as far as the contact plane 136 of the underside 132 of the main body 104.

Regions in which the recesses 112 are spaced from the contact plane 136 of the underside 132 will be referred to hereinafter as regions with reduced level difference $N_R$ (in particular see FIGS. 4 and 6).

In principle, it can be provided that the regions with reduced level difference $N_R$ and the curvature expansion regions 148 are congruent, since it is precisely the curvature expansion regions 148 that are exposed to a greater risk of tearing of the material.

However, it has surprisingly been found that the risk of the undesirable tearing of the main body 104 in a curvature expansion region 148 can also be drastically reduced when a parallel expansion region 146 adjoining the curvature expansion region 148 has a raised channel base 140, that is to say is a region with reduced level difference $N_R$. The curvature expansion region 148 actually at risk can then itself be a region with normal level difference $N_N$ (see in particular FIG. 2).

As can be derived in particular from FIG. 6, the reduced channel cross-section resulting from the raising of the channel base can be compensated for by sloping of a flank 138.

The risk of the formation of a tear can also be reduced preferably by the formation of a sloped flank 138 of this type.

The flow element 102 illustrated in FIGS. 1 to 9 can be placed by way of example by means of its underside 132 against a further flow element 102.

The two flow elements 102 can have differently shaped channel structures 118.

Figure 10:
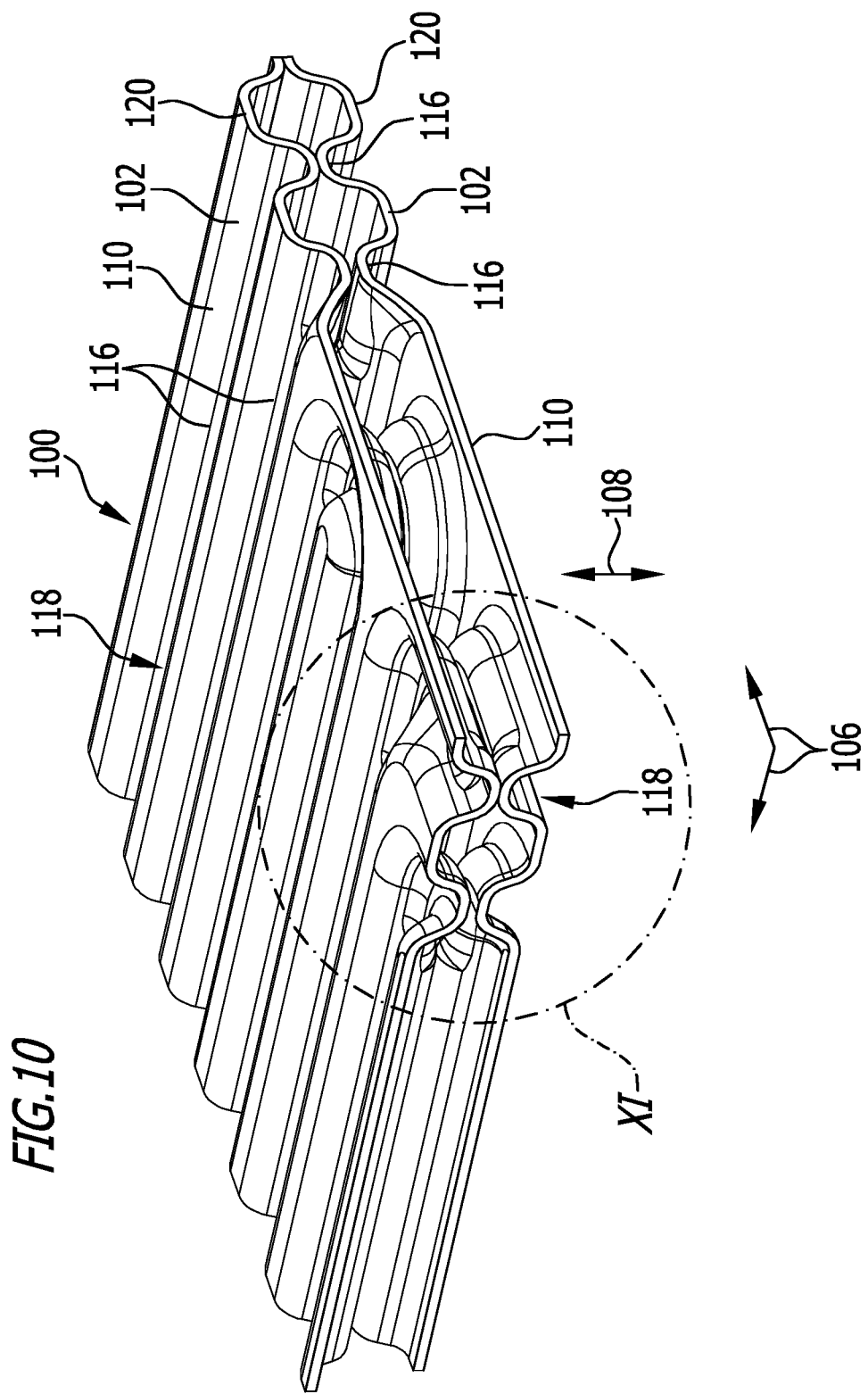
FIG. 10 shows a schematic perspective illustration of a bipolar plate comprising a flow element according to FIG. 1.
Figure 11:
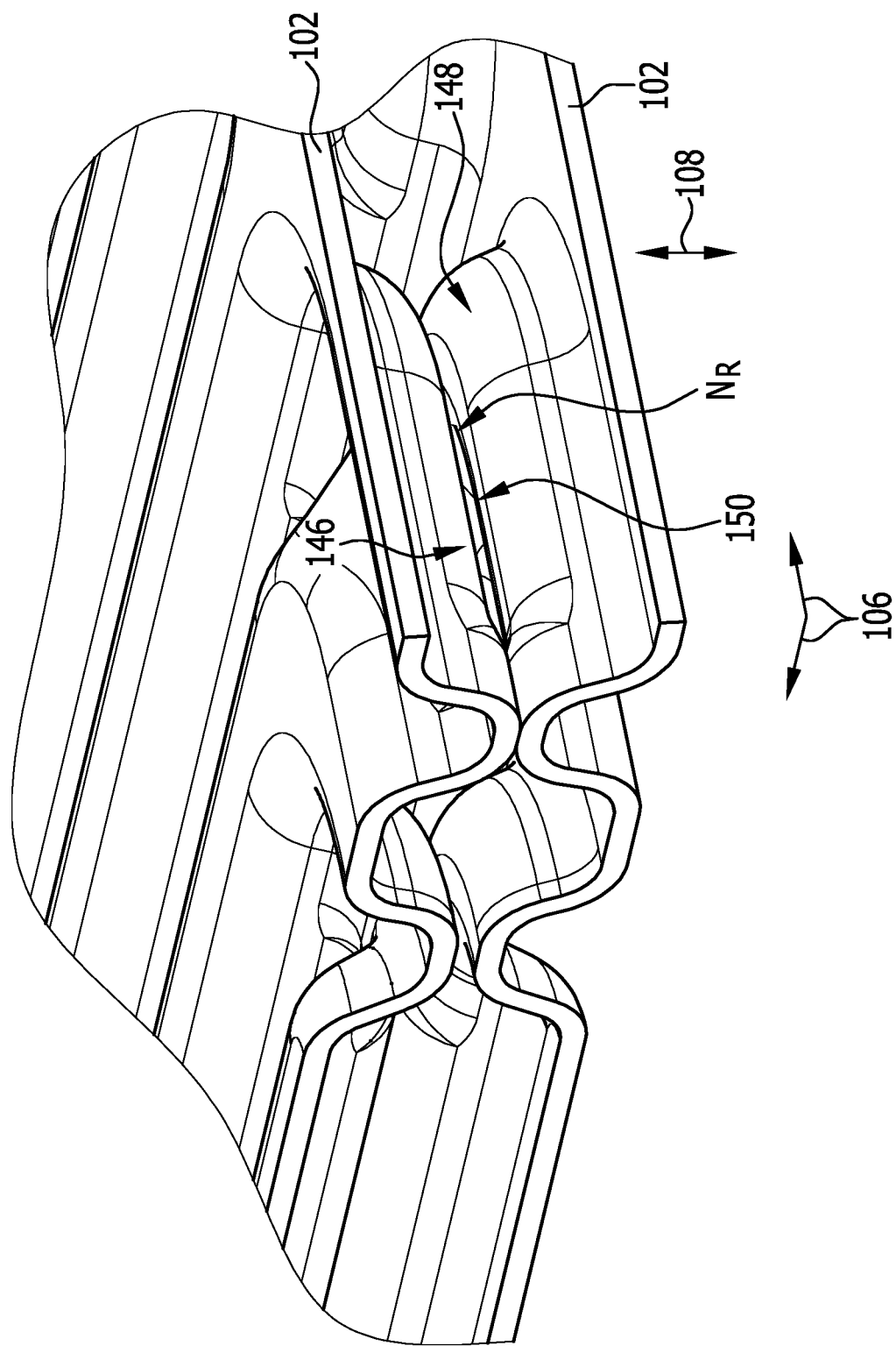
FIG. 11 shows an enlarged illustration of the region XI in FIG. 10.

In the embodiment of a bipolar plate 100 illustrated in FIGS. 10 and 11, it is provided that the flow elements 102 are mirror-symmetrical to one another with respect to a contact plane 136 of an underside 132 of the flow element 102 illustrated in FIGS. 1 to 9.

On account of this mirror-symmetrical embodiment of the flow elements 102, reference will be made hereinafter to the underside 132 of any flow element 102 in such a way that this is the side of the flow element 102 which is arranged facing towards the other flow element 102.

The flow elements 102 thus abut against one another by means of their respective undersides 132.

The contact plane 136 is thus a common contact plane 136 in which the flow elements 102 are in direct contact with one another.

The flow elements 102 consequently contact one another in precisely those regions in which the respective main bodies 104 extend as far as the contact plane 136.

In particular, the flow elements 102 thus abut against one another by means of their recesses 112 in the regions with normal level difference $N_N$.

In the regions with reduced level difference $N_R$, the flow elements 102 by contrast are arranged spaced apart from one another, such that a gap 150 is formed between the flow elements 102.

Fluid guided between the flow elements 102 can pass through this gap 150.

The gap 150 is thus in particular a flow transfer region or a flow gate, which permits a passage of fluid between channels 116 actually separated from one another.

The above-described bipolar plate 100 is produced as follows:

Firstly, a metal sheet is provided for production of a flow element 102.

This metal sheet, which forms the main body 104, is processed by deformation, in particular stamping.

As a result of the deformation process, the recesses 112 and raised portions 114 of the main body 104 are in particular formed, so as to ultimately produce the channel structure 118.

As a result of the specific formation of regions of normal level difference $N_N$ and regions with reduced level difference $N_R$, a material expansion to an undesirable extent in the curvature expansion regions 148 of the main body 104 can be avoided. The flow element 102 is thus provided with high stability and nevertheless permits efficient flow guiding.

As can be derived in particular from FIGS. 1 to 9, curvature expansion regions 148 can be provided, for example at channel ends 152 and/or at curved or bent channel segments 124.

The parallel expansion regions 146, which in particular comprise regions with reduced level difference $N_R$, are in particular regions of linear channel segments 122 of the channels 116.

The further flow element 102 is produced correspondingly from a metal sheet.

Lastly, the two flow elements 102 are connected to each other, for example welded to each other, in order to complete the bipolar plate 100.

The invention claimed is:

1. Flow element, comprising a plate-like main body which is formed as a shaped sheet metal product and has a channel structure,
    wherein the channel structure comprises a plurality of channels which are formed by recesses in the main body and are separated from one another by raised portions of the main body,
    wherein there is provided at least one region with normal level difference ($N_N$) that denotes, with respect to a height direction running perpendicular to two main directions of extent of the main body, a height difference between a recess and an adjoining raised portion,
    wherein there is provided at least one region with reduced level difference ($N_R$), in which a height difference between a recess and an adjoining raised portion is less than the normal level difference ($N_N$),
    wherein the at least one region with reduced level difference ($N_R$) comprises a parallel expansion region of the main body that, in the event of an expansion of the main body resulting from the deformation of the shaped sheet metal product, is expanded along expansion vectors which lie in a plurality of mutually parallel planes,
    wherein the at least one region with reduced level difference ($N_R$), that comprises the parallel expansion region of the main body, extends into a curvature expansion region of the main body which, in the event of an expansion of the main body resulting from the deformation of the shaped sheet metal product, is expanded along expansion vectors which lie in intersecting planes,
    wherein the curvature expansion region is a region of the main body which comprises a curved or bent channel segment of a channel or is formed by a curved or bent channel segment of a channel, and
    wherein the curved or bent channel segment is a channel segment in which a fluid is guided or can be guided along a curved or bent flow path,
    wherein the curved or bent channel segment is a channel segment which runs between two raised portions, wherein said two raised portions are curved or bent.

2. Flow element according to claim 1, wherein at least one region with reduced level difference ($N_R$) comprises exclusively a parallel expansion region of the main body.

3. Flow element according to claim 1, wherein at least one parallel expansion region is a region of the main body which comprises a substantially linear channel segment of a channel or is formed by a substantially linear channel segment of a channel.

4. Flow element according to claim 1, wherein, in at least one region with normal level difference ($N_N$), on the one hand a channel base formed by a recess and on the other hand a rib formed by the adjoining raised portion run substantially parallel to one another.

5. Flow element according to claim 1, wherein, in at least one region with normal level difference ($N_N$), on the one hand a channel base formed by a recess and on the other hand a rib formed by the adjoining raised portion run skewed relative to one another.

6. Flow element according to claim 1, wherein, in at least one region with reduced level difference ($N_R$), on the one hand a channel base formed by the recess and on the other hand a rib formed by the adjoining raised portion run substantially parallel to one another.

7. Bipolar plate for an electrochemical device, comprising one or more flow elements according to claim 1.

8. Bipolar plate for an electrochemical device, comprising one or more flow elements according to claim 1, wherein the bipolar plate comprises a first flow element and at least one further flow element, wherein the first flow element and/or the at least one further flow element are flow elements according to claim 1.

9. Bipolar plate according to claim 8, wherein the first flow element is arranged on the further flow element in such a way that the recesses in the main body extend in the direction of the further flow element.

10. Bipolar plate according to claim 9, wherein the recesses in the main body lie against the further flow element at least in segments in the region of a channel base of the recesses.

11. Bipolar plate according to claim 8, wherein at least one region with reduced level difference ($N_R$) of the main body of the first flow element is arranged at a spacing from the further flow element.

12. Bipolar plate according to claim 8, wherein at least one segment of a parallel expansion region of the main body of the first flow element is arranged at a spacing from the further flow element.

13. Bipolar plate according to claim 8, wherein at least one segment of a curvature expansion region of the main body of the first flow element is arranged at a spacing from the further flow element.

14. Method for producing a flow element, in particular a flow element according to claim 1, wherein the method comprises the following steps:
  providing a main body;
  deforming the main body so as to form a channel structure,
    wherein the channel structure comprises a plurality of channels which are formed by recesses in the main body and are separated from one another by raised portions of the main body,
  wherein at least one region with normal level difference ($N_N$) is formed that denotes, with respect to a height direction running perpendicular to two main directions of extent of the main body, a height difference between a recess and an adjoining raised portion,
  wherein at least one region with reduced level difference ($N_R$) is formed, in which a height difference between a recess and an adjoining raised portion is less than the normal level difference ($N_N$),
  wherein the at least one region with reduced level difference ($N_R$) comprises a parallel expansion region of the main body that, in the event of the deformation of the main body, is expanded along expansion vectors which lie in a plurality of mutually parallel planes,
  wherein the at least one region with reduced level difference ($N_R$), that comprises the parallel expansion region of the main body, extends into a curvature expansion region of the main body which, in the event of the deformation of the main body, is expanded along expansion vectors which lie in intersecting planes,
  wherein the curvature expansion region is a region of the main body which comprises a curved or bent channel segment of a channel or is formed by a curved or bent channel segment of a channel, and
  wherein the curved or bent channel segment is a channel segment in which a fluid is guided or can be guided along a curved or bent flow path,
  wherein the curved or bent channel segment is a channel segment which runs between two raised portions, wherein said two raised portions are curved or bent.

15. Flow element according to claim 1, wherein the channel structure comprises two or more channel paths each connecting an inlet side of the channel structure to an outlet side of the channel structure, wherein a channel path comprises one or more meandering segments, in which a fluid is guided or can be guided in a meandering manner.

16. Flow element according to claim 1,
  wherein in the at least one region with the normal level difference ($N_N$), a recess extends as far as a contact plane of an underside of the main body,
  wherein in the at least one region with the reduced level difference ($N_R$), a recess is spaced from the contact plane of the underside of the main body, and
  wherein the adjoining raised portion extends as far as a contact plane of an upperside of the main body in the at least one region with the normal level difference ($N_N$) and in the at least one region with the reduced level difference ($N_R$).

17. Flow element, comprising a plate-like main body which is formed as a shaped sheet metal product and has a channel structure,
  wherein the channel structure comprises a plurality of channels which are formed by recesses in the main body and are separated from one another by raised portions of the main body,
  wherein there is provided at least one region with normal level difference ($N_N$) that denotes, with respect to a height direction running perpendicular to two main directions of extent of the main body, a height difference between a recess and an adjoining raised portion,
  wherein there is provided at least one region with reduced level difference ($N_R$), in which a height difference between a recess and an adjoining raised portion is less than the normal level difference ($N_N$),
  wherein the at least one region with reduced level difference ($N_R$) comprises a parallel expansion region of the main body that, in the event of an expansion of the main body resulting from the deformation of the shaped sheet metal product, is expanded along expansion vectors which lie in a plurality of mutually parallel planes,
  wherein the at least one region with reduced level difference ($N_R$), that comprises the parallel expansion region of the main body, extends into a curvature expansion region of the main body which, in the event of an expansion of the main body resulting from the deformation of the shaped sheet metal product, is expanded along expansion vectors which lie in intersecting planes,
  wherein the curvature expansion region is a region of the main body which comprises a curved or bent channel segment of a channel or is formed by a curved or bent channel segment of a channel, and wherein the curved or bent channel segment is a channel segment in which a fluid is guided or can be guided along a curved or bent flow path, wherein in the at least one region with the normal level difference ($N_N$), a recess extends as far as a contact plane of an underside of the main body, wherein in the at least one region with the reduced level difference ($N_R$), a recess is spaced from the contact plane of the underside of the main body, and wherein the adjoining raised portion extends as far as a contact plane of an upperside of the main body in the at least one region with the normal level difference ($N_N$) and in the at least one region with the reduced level difference ($N_R$).

18. Flow element, comprising a plate-like main body which is formed as a shaped sheet metal product and has a channel structure, wherein the channel structure comprises a plurality of channels which are formed by recesses in the main body and are separated from one another by raised portions of the main body, wherein there is provided at least one region with normal level difference ($N_N$) that denotes, with respect to a height direction running perpendicular to two main directions of extent of the main body, a height difference between a recess and an adjoining raised portion, wherein there is provided at least one region with reduced level difference ($N_R$), in which a height difference between a recess and an adjoining raised portion is less than the normal level difference ($N_N$), wherein the at least one region with reduced level difference ($N_R$) comprises a parallel expansion region of the main body that, in the event of an expansion of the main body resulting from the deformation of the shaped sheet metal product, is expanded along expansion vectors which lie in a plurality of mutually parallel planes, wherein the at least one region with reduced level difference ($N_R$), that comprises the parallel expansion region of the main body, extends into a curvature expansion region of the main body which, in the event of an expansion of the main body resulting from the deformation of the shaped sheet metal product, is expanded along expansion vectors which lie in intersecting planes, wherein the curvature expansion region is a region of the main body which comprises a channel end, wherein the channel end is a segment of a channel in which both a recess forming the channel and two raised portions which delimit the channel terminate.

* * * * *